United States Patent

Spencer et al.

[11] Patent Number: 5,899,497
[45] Date of Patent: May 4, 1999

[54] TILT-ADJUSTABLE STEERING COLUMN ASSEMBLY

[75] Inventors: Joseph C. Spencer; Corbin G. Glidden, both of Coldwater, Mich.

[73] Assignee: Douglas Autotech Corp., Bronson, Mich.

[21] Appl. No.: 08/937,040

[22] Filed: Sep. 24, 1997

[51] Int. Cl.⁶ .................................................. B62D 1/18
[52] U.S. Cl. ........................ 280/775; 74/493; 403/56; 403/77
[58] Field of Search ........................... 280/775, 777; 74/493; 403/52, 56, 76, 77

[56] References Cited

U.S. PATENT DOCUMENTS

| | | |
|---|---|---|
| 677,869 | 7/1901 | Kinsler . |
| 1,191,313 | 7/1916 | Johnston . |
| 1,743,672 | 1/1930 | Hufferd . |
| 2,272,852 | 2/1942 | Schaefer . |
| 2,545,646 | 3/1951 | Blinkman . |
| 4,594,909 | 6/1986 | Yamaguchi . |
| 4,793,204 | 12/1988 | Kubasiak . |
| 4,903,540 | 2/1990 | Beauch . |
| 4,925,210 | 5/1990 | Peitsmeier . |
| 5,078,022 | 1/1992 | Ichikawa . |
| 5,143,402 | 9/1992 | Higashino . |
| 5,209,622 | 5/1993 | Kazino . |
| 5,452,624 | 9/1995 | Thomas . |
| 5,605,351 | 2/1997 | Higashino . |

FOREIGN PATENT DOCUMENTS

| | | |
|---|---|---|
| 5686863 | 7/1981 | Japan . |
| 2249761 | 10/1990 | Japan . |

*Primary Examiner*—Paul N. Dickson
*Attorney, Agent, or Firm*—Miller, Johnson, Snell & Cummiskey, P.L.C.

[57] ABSTRACT

A tilt-adjustable steering column assembly, comprising in combination an upper housing pivotally attached to a lower housing along a generally horizontal axis transverse to the upper and lower housings, the pivotal attachment accomplished by a pair of pins, each having a threaded intermediate shaft received in a threaded opening extending through opposite sides of the lower housing, and further having generally hemispherical pins, each received in a complementary-shaped recess formed on opposite sides of the upper housing to form a hemispherical bearing surface and preloading the upper housing in compression.

18 Claims, 3 Drawing Sheets

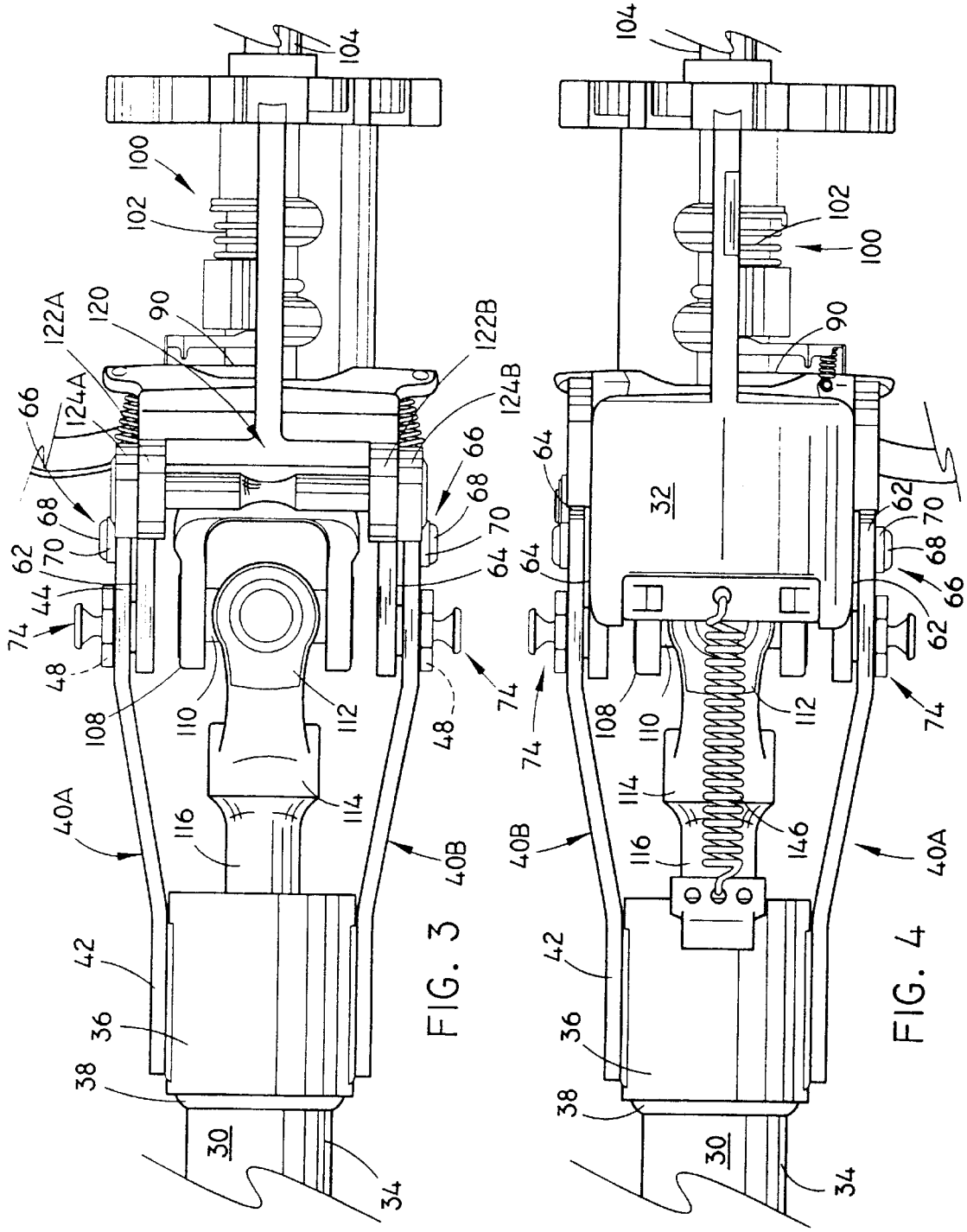

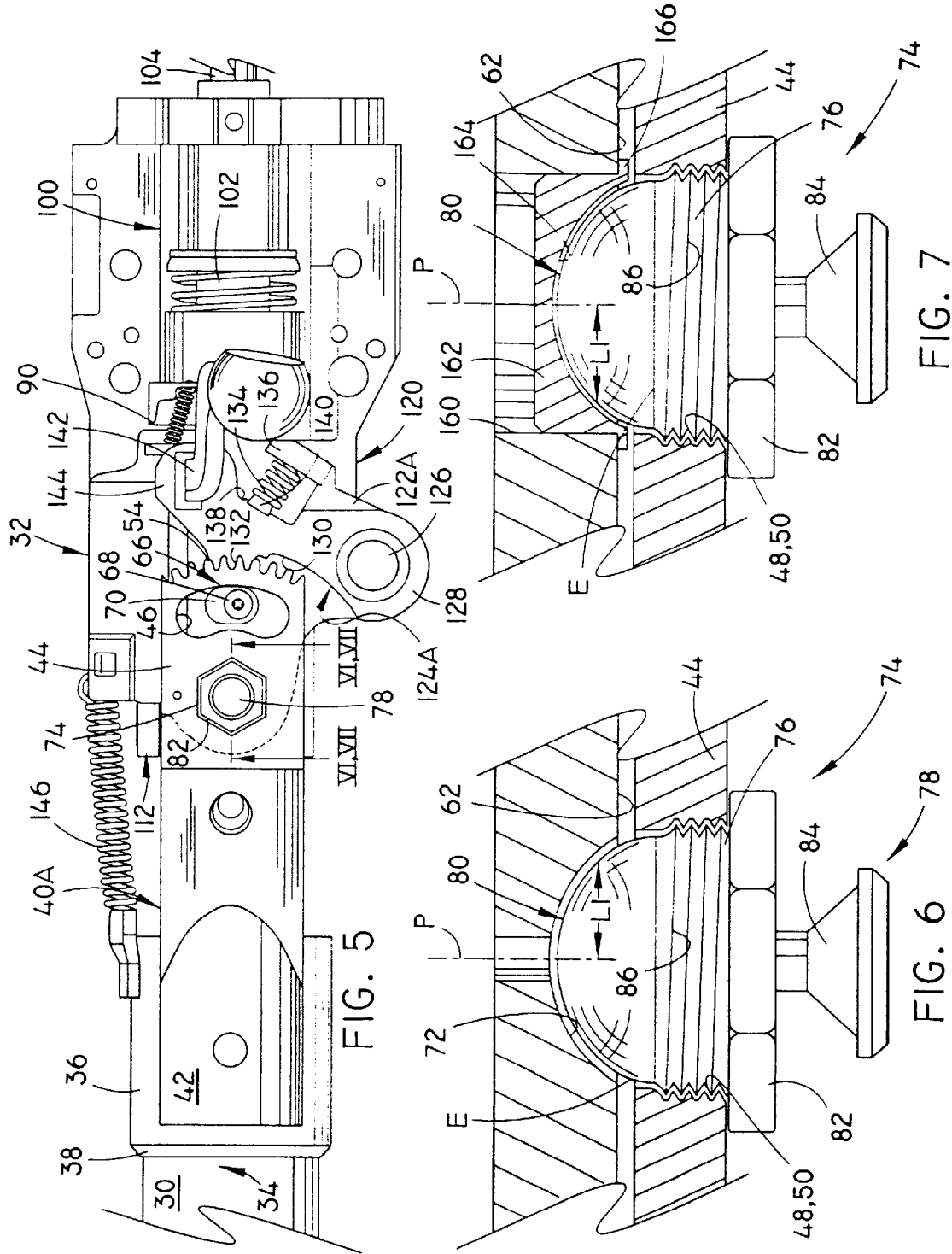

TILT-ADJUSTABLE STEERING COLUMN ASSEMBLY

BACKGROUND OF THE INVENTION

1. Field of the Invention

This invention relates to articulated joints, and particularly to articulated joints in tilt-adjustable steering column assemblies.

2. Brief Description of The Related Art

The articulating joints used in tilt-adjustable steering columns have not deviated substantially since they were first introduced. Essentially a lower housing is pivotally coupled to an upper housing by two diametrically opposing horizontal pins which are threaded into one of the housings and have a bearing surface at an intermediate point along the shaft for pivotally supporting the other housing. The weight of the upper housing attached to the steering wheel, whether the inner or outer housing, places a load on the bearing surface of the pins. As the upper housing rotates with respect to the lower housing, torque is produced by the tilting action on the bearing surface which can loosen the pins. As the pivotal coupling loosens, substantial backlash results in the coupling. If allowed to progress, the entire assembly can fail, resulting in possible loss of control of the vehicle and injury to the operator. Examples of articulating joints in tilt-adjustable steering columns having the construction described above are disclosed in U.S. Pat. Nos. 4,594,909 (FIG. 4) and 4,903,540 (FIG. 3).

Variations of this aforementioned assembly have simply reversed the location of the bearing surface on the pins. For example, the threads are located along the cylindrical shaft of the pin, and the cylindrical bearing surface is located toward the end of the pin. For example, see U.S. Pat. Nos. 5,605,351 and 4,925,210. In this situation, the torque produced by the tilting action of the respective components produces the same result. The angular forces produced by the torque, coupled with the arm of the arc from the axis of the respective pin, tends to rotate the pin out of the threaded coupling to loosen the connection with the same possible results.

An additional disadvantage resulting from the conventional pivotal coupling described above is the long term wear on the bearing surfaces of the pins. Irrespective of the relative position of the upper and lower housings, the load on the bearing is either along the upper or lower surface. Because most of the friction in the coupling takes places at either of these locations, the bearing surfaces tend to become eccentric. As a result, the coupling becomes unstable producing substantial backlash and the possibility of failure.

The various embodiments of the articulating joint used in the steering column embodying the instant invention substantially reduce the backlash associated with the loosening of the pins making the pivotal connection. Test results have shown that with time, the coupling in the instant invention actually improves.

SUMMARY OF THE INVENTION

In general, the articulated joint embodying the instant invention can be described as a ball-socket tilt joint wherein a first member is pivotally coupled to a second member by a pair of diametrically opposing pins extending through the first member into the second member. Each pin in the pair includes a threaded shaft terminating at one end in a hemispherical tip. The opposite end of the shaft terminates in a faceted head to assist in threading the shaft through the opening in the first member. The hemispherical tip of each pin is received in a hemispherical socket of slightly different geometry defined in the second member such that an area at the pole of the hemisphere contacts the hemispherical socket.

In another form, a tilt-adjustable steering column assembly is provided and includes diametrically opposing brackets extending from a second end of a lower steering column housing. Each of the brackets has an opening extending transversely therethrough at a point distant from the end of the lower housing. An upper housing has an end disposed between the diametrically opposing brackets. The upper housing has diametrically opposing hemispherical depressions formed therein, each of the depressions being located adjacent and aligned with the transversely extending openings. The steering column housing and the upper housing are pivotally connected by a respective pin extending through each of the transversely extending openings and into the hemispherical depressions. Each pin includes a threaded shaft and a hemispherical tip to produce a bearing surface and forming the pivotal coupling.

In yet another form of the invention, a tilt-adjustable steering column assembly is provided, including an upper housing pivotally attached to a lower housing along a generally horizontal axis transverse to the upper and lower housings. The pivotal attachment is accomplished by a pair of pins, each pin in the pair having a threaded intermediate portion received in a threaded opening extending through opposite sides of the lower housing, and further having a generally hemispherical tip received in a generally correspondingly shaped recess formed on each side of the upper housing to form a hemispherical bearing surface. Tightening of the pins into the hemispherical recesses preloads the upper housing in compression.

The significant advantages of the instant invention over the prior designs include a substantial reduction in backlash in the pivoting coupling. Instead of loosening and increased backlash with time, the stability of the pivotal coupling actually improves with wear. The hemispherical tip of each pin has a tendency to be centered in the respective hemispherical depression/recess to minimize the surface area of the bearing surface to an area concentrated about the pole of each tip. Furthermore, the hemispherical shape of the bearing surfaces reduces the torque arm of the rotational forces exerted on the pins during the pivotal action of the joint. These and other features, advantages and objects of the present invention will be further understood and appreciated by those skilled in the art by reference to the following specification, claims and appended drawings.

BRIEF DESCRIPTION OF THE DRAWING FIGURES

FIG. 3 is a bottom plan view of the steering column assembly embodying the invention shown in FIG. 2;

FIG. 4 is a plan view of the steering column assembly embodying the invention shown in FIG. 2;

FIG. 5 is a side elevational view of the steering column assembly embodying the invention shown in FIG. 2;

FIG. 6 is a fragmentary section view of the steering column assembly embodying the invention, taken along line VI—VI shown in FIG. 5; and FIG. 7 is a fragmentary section view of the steering column assembly taken along the line VII—VII shown in FIG. 3.

DETAILED DESCRIPTION OF THE VARIOUS EMBODIMENTS

Figure 1:
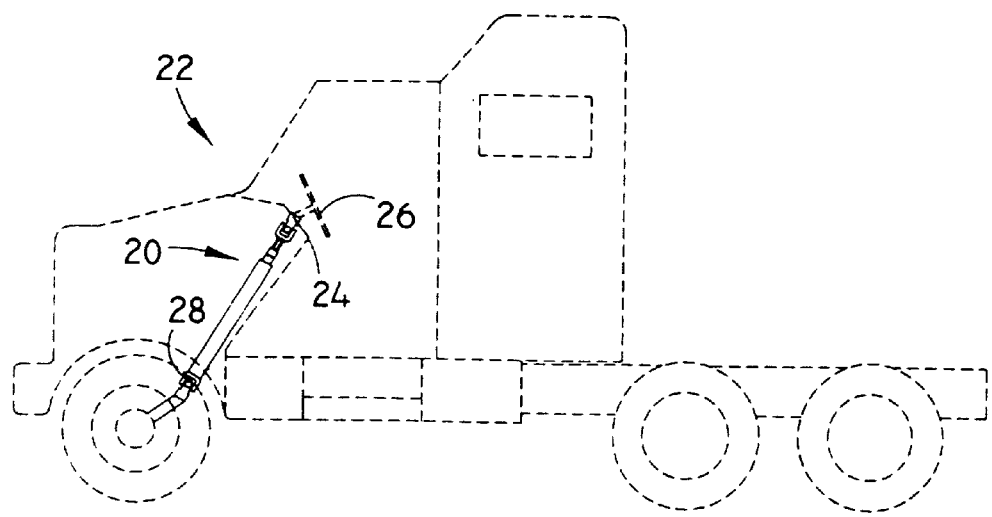
FIG. 1 is a schematic diagram illustrating one environment of application of the invention.
Figure 2:
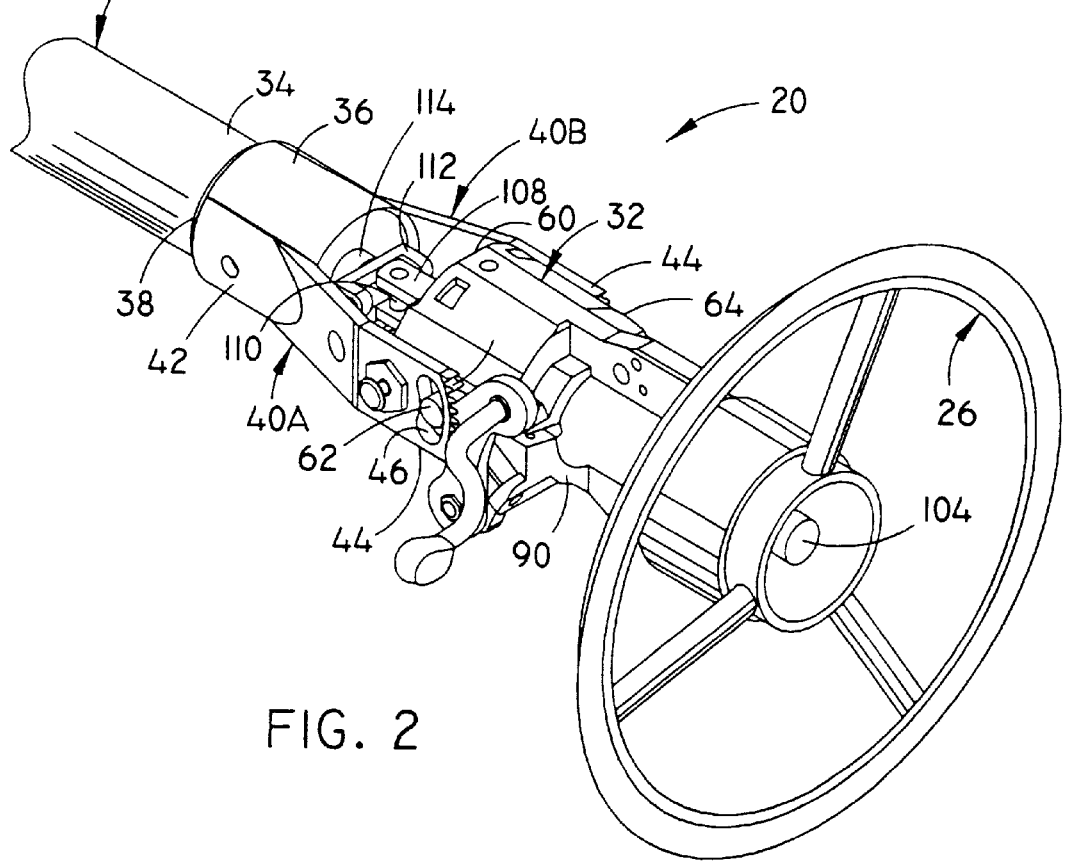
FIG. 2 is a perspective view of a steering column assembly embodying the invention.

The articulated joint embodying the instant invention is useful in a number of applications wherein one member pivots about an axis defined by two opposing pins retaining that member. More specifically, the instant invention has particular application in tilt-adjustable steering column assemblies such as the one identified by reference numeral 20 shown in FIG. 1. In this particular application, the steering column assembly 20 is in a vehicle 22 such as an automobile or a truck and is attached at an upper end 24 to a steering wheel 26 and at a lower end 28 to a steering gear box (not shown). In turn, the steering gear box is interconnected to the guide wheels of the vehicle. Although the instant invention is described as having a specific application in a steering column assembly, it is anticipated that the invention will be useful in substantially any application having an articulating joint.

Referring to FIGS. 2 through 5, the tilt-adjustable steering column assembly 20 embodying the instant invention includes a tubular lower housing 30 pivotally interconnected to an upper housing 32 which contains the steering wheel 26 at its upper end. The tubular lower housing 30 is preferably made from tubular steel or aluminum having an upper end 34 attached to a collar 36 by a weldment 38. Attached to opposite sides of collar 36, and extending toward upper housing 32 are brackets 40a and 40b. Each bracket 40a, 40b includes a lower end 42 rigidly secured to collar 36 by a weld and a second opposite end 44 spaced from the upper end 34 and collar 36. As shown more clearly in FIGS. 3–5, each bracket 40a, 40b is preferably shaped such that the brackets diverge and extend outwardly from a longitudinal axis of the lower housing 30 by a distance sufficient to receive the upper housing 32 therebetween. Extending transversely through each bracket are at least two openings 46 and 48. Opening 46 is a generally arcuate aperture closest to end 44 of the bracket. The second opening 48 preferably contains threads 50 (FIGS. 6, 7) and is located between arcuate aperture 46 and the lower end 42 of each bracket. The end 44 of each bracket 40a, 40b has been machined or otherwise formed in an array of teeth 54 arranged along a generally arcuate path generally paralleling that of arcuate aperture 46. The arcuate array of gear teeth 54 may be present on the ends 44 of one or both brackets 40a and 40b. In a preferred embodiment, brackets 40a, 40b are stamped or otherwise formed from steel bar stock and have the lower end 42 welded to the collar 36 to produce a rigid yoke or fork attachment at the upper end 34 of the lower housing 30.

Received between the ends 44 of the brackets 40a, 40b is a lower end or portion 60 of the upper housing 32. The lower end 60 of the upper housing 32 preferably has a generally cylindrical or polygonal shape having two diametrically opposing and parallel external side walls 62, 64 (FIG. 4), each of which is adjacent one of the brackets 40a, 40b. Extending from walls 62, 64 and received in the arcuate slots or apertures 46a, 46b is a guide or cam 66. Each cam 66 includes a guide pin 68 threaded onto housing 32 and retaining an externally mounted bushing 70 thereon having a first width substantially equal to or slightly less than the short axis of the arcuate opening 46 and a second orthogonal width of a predetermined dimension to control the arcuate travel of each cam 66 within the arcuate opening 46.

Extending through each opening 48 in brackets 40a, 40b, and received in a hemispherical recess 72 formed in each side wall 62, 68 is a respective pin 74. Each pin 74 includes a shaft 76 terminating at one end 78 in a tip to facilitate location and placement of the pin. The opposite end 80 of the pin terminates in the shape of a hemisphere of a dimension slightly less than that of hemispherical socket 72. Intermediate the hemispherical tip 80 of pin 74 and the opposite end 78 is a faceted flange 82 coupled to end 78 by a flared shaft 84. Intermediate flange 82 and hemispherical tip 80, the shaft is threaded at 86 to engage threads 50 within opening 48.

As briefly mentioned above, the dimensions of hemispherical tip 80 are slightly different than the dimensions of hemispherical socket 72 such that when hemispherical pin 74 is received within socket 72, only a portion of the tip 80 surrounding the apex or pole (P) is in direct contact with the socket 72. See FIG. 7. When pin 74 is tightened against socket 72, the tip 80 places a load on side walls 62, 64, forcing them slightly inwardly. The gap between the equatorial position (E) of the tip 80 and the socket 72 is reduced. As a result of the sloping surfaces of the socket forming the bearing surface for the pin 74, the pin is forced to the lowermost point in the socket 72 and is centered. In a preferred embodiment of the bearing, a port or passage 88 extends into the housing 32 from the lowermost point in the socket 72.

The interior of the upper housing 32 includes a series of concentrically arranged chambers extending from end 60 to end 90. A portion of one side wall of the housing exposes the interior to provide a coupling point for additional hardware associated with the steering column such as turn signals and the like, the details of which will not be addressed herein.

Extending longitudinally through the chambers in upper housing 32 from the upper end 90 to end 60 is an upper shaft assembly 100 including a shaft 102 having an upper end 104 attached to the steering wheel 26. The lower end 106 of the shaft 102 is attached to a yoke 108. The yoke 108 is interconnected by a spider 110 to a second yoke 112 oriented 90 degrees to yoke 108. The second yoke 112 in turn is coupled to the upper end 114 of a lower shaft 116. The lower shaft extends from a point proximate ends 44 of brackets 40a, 40b and extends substantially entirely through the lower tubular housing 30. Bearings, not shown, provided along the chambers in the upper housing 32 support shaft 102.

Referring to FIGS. 3 and 5, extending from a lower surface 120 of upper housing 32 is at least one, and preferably two flanges 122a, 122b. Pawls 124a and 124b are each disposed outboard of the flanges 122a, 122b and are pivotally coupled thereto by a shaft 126 extending through a lower end 128 of each pawl and flanges 122a, 122b. The coupling between the shaft 126 and each pawl 124a, 124b is such that upon the movement of one pawl, such as 124a, pawl 124b also moves or pivots about the axis defined by shaft 126. An edge 130 of each pawl 124a, 124b adjacent the arcuate array of gear teeth 54 includes a complementary set of gear teeth 132 configured to mesh with the gear teeth 54. Teeth 132 are urged into contact with teeth 54 by a biasing member or spring 134 disposed between a tab 136 extending outwardly from flange 120 and an opposite side or edge 138 of each pawl 124a, 124b. A horn 140 extends from edge 138 of each pawl 124a, 124b along an axis coincident with that of the spring 134 to retain the spring in position. One end of a handle or lever 142 passes freely through an opening formed in pawl 124a at a point proximate an upper end 144 and is pivotally coupled to the upper housing 32.

An alternate embodiment of the coupling of the upper housing 32 to brackets 40a, 40b is shown in FIG. 7. In the alternate embodiment, the opposing parallel side walls 62, 64 of the upper housing have diametrically opposing recesses 160 extending therethrough proximate the lower end 60. Each passage 160 receives a bushing 162 therein having a hemispherical socket 164 defined therein surrounded by a flange 166. Each hemispherical socket 164 is configured to receive the hemispherical head 80 of pin 74. As in the previous embodiment, the shaft 76 of each pin 74 is threaded and is received in the opening 48 extending through each of the brackets 40*a*, 40*b*.

With the steering column assembled as shown in either one of the embodiments shown in the drawing figures, the operator is able to adjust the tilt angle of the steering wheel 26 with respect to the lower tubular housing 30 by pulling on lever 142 to disengage teeth 132 from the arcuate array of gear teeth 54. Disengagement of the teeth permits the upper housing 32 to pivot about pins 74. The universal joint defined by yokes 108, 112 and spider 110 permits the angular deflection of the upper shaft 102 with respect to the lower shaft 116. Once the desired tilt angle is achieved, the operator releases the lever 142 wherein spring 134 urges the gear teeth 132 on each pawl into engagement with the arcuate array of gear teeth 54. Springs 146 interconnecting collar 136 to housing 38 automatically tilt upper housing 32 and steering wheel 26 upwardly upon disengagement of the gear teeth 132 and 54. The tension is sufficient to place the steering wheel in the uppermost angular position upon pulling of lever 142 to enable the occupant of the vehicle to enter and leave the vehicle without any obstruction.

The hemispherical bearing provided by socket 76 and pin 74 for the pivot point between the upper housing 32 and the brackets 40*a*, 40*b* is an improvement over prior assemblies because of the reduced torque or friction achieved by the hemispherical pin and socket. As shown in FIGS. 6 and 7, the pole P represents the point about which the upper housing pivots with respect to the brackets 40*a* and 40*b*. Because the hemispherical socket 72 has a slightly greater radius of curvature than the convex hemispherical tip 80 of the pin 74 and because of the self-centering nature of the convex hemispherical tip within the hemispherical socket, only that portion of the pin between pole P and a circle defined by radius L1 is in contact with the socket upon rotation. Thus the torque arm is much less than the torque arm equal to one half of line E present in conventional coupling arrangements. Additionally, the self-centering characteristic achieved by the concave hemispherical socket and the convex hemispherical pin produces less backlash than prior systems once the pins are tightened and a load is placed on the closing parallel side walls 62 and 64.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. A tilt-adjustable steering column assembly, comprising in combination:

a lower steering column housing;

first and second diametrically opposing brackets attached to and extending from one end of said lower steering column housing;

an upper housing disposed between said first and second diametrically opposing brackets, said upper housing having a hemispherical depression defined on each of at least two opposite sides adjacent said first and second diametrically opposing brackets; and a hemispherical pin extending through each of said first and second diametrically opposing brackets and received in said hemispherical depression defined in said sides of said upper housing, and places a load on said upper housing.

2. The tilt-adjustable steering column as defined in claim 1, further comprising:

a locking mechanism pivotally coupled to said upper housing and selectively engaging a plurality of teeth on said first and second brackets; and a cam attached to each said sides of said upper housing and extending through said first and second diametrically opposing brackets.

3. The tilt-adjustable steering column as defined in claim 2, wherein said hemispherical depression is formed in exterior walls of said upper housing.

4. The tilt-adjustable steering column as defined in claim 2, wherein said hemispherical depression is formed in a bushing received in a hole formed in each of said at least two opposite sides.

5. The tilt-adjustable steering column as defined in claim 2, wherein said hemispherical pin includes a threaded intermediate shaft terminating in a hemispherically shaped first end and a faceted second end.

6. The tilt-adjustable steering column as defined in claim 2, wherein said locking mechanism includes:

at least one pawl pivotally coupled to said upper housing and having at least one gear tooth engaging one of said plurality of teeth on one of said first and second diametrically opposing brackets; and an actuator handle extending through said at least one pawl; and a biasing member disposed between said at least one pawl and said upper housing for urging said pawl into engagement with said plurality of teeth.

7. A tilt-adjustable steering column assembly, comprising:

an upper housing pivotally attached to a lower housing by two pins, each having a threaded intermediate shaft received in a threaded opening extending through opposite sides of said lower housing, and further having a hemispherical tip received in a complementary-shaped recess formed in said upper housing to form a hemispherical bearing surface and loading said upper housing in compression.

8. The tilt-adjustable steering column assembly as defined in claim 7, further including at least one cam extending from said upper housing and received in a cam follower defined in said lower housing for limiting a tilt range of said upper housing with respect to said lower housing about said generally horizontal axis.

9. The tilt-adjustable steering column assembly as defined in claim 8, wherein said complementary-shaped recess includes a hemispherically shaped depression.

10. The tilt-adjustable steering column assembly as defined in claim 9, wherein said hemispherically shaped depression is in each of said opposite sides of said upper housing.

11. The tilt-adjustable steering column assembly as defined in claim 10, wherein said hemispherically shaped depression is defined in a bushing, said bushing received in a hole on each of said opposite sides of said upper housing.

12. The tilt-adjustable steering column assembly as defined in claim 11, further including a locking mechanism for fixing a tilt position of said upper housing with respect to said lower housing, said locking mechanism having at least one pawl pivotally coupled to said upper housing and having a plurality of teeth defined along one end; a complementary set of teeth defined on a facing end of said lower housing; a biasing member between said pawl and said upper housing for forcing said plurality of teeth into engagement with said complementary set of teeth; and a lever attached to said upper housing and said pawl for disengaging said plurality of teeth and said complementary set of teeth.

13. An articulating joint for a tilt-adjustable steering column assembly, comprising in combination:

a first steering column housing;

a second steering column housing; and two diametrically opposing hemispherically tipped pins extending through opposite sides of said first steering column housing and into complementary shaped recesses located in opposite sides of said second steering column housing.

14. The articulating joint as defined in claim 13, further including a cam follower defined in at least one of said first and second steering column housing and a cam extending from an opposite side of one of said first and second steering column housing and received in said cam follower.

15. The articulating joint as defined in claim 14, further including a locking mechanism pivotally coupled to one of said first and second steering column housings and configured to engage in locking relationship the other of said first and second steering column housings.

16. The articulating joint as defined in claim 15, wherein each of said two diametrically opposing hemispherically tipped pins includes a threaded shaft intermediate a flange portion and a hemispherically shaped tip.

17. The articulating joint as defined in claim 16, wherein each of said complementary-shaped recesses is formed in each of said opposite sides of said second steering column housing.

18. The articulating joint as defined in claim 17, wherein each of said complementary-shaped recesses is formed in a bushing received in an opening defined in each of said opposite sides of said second steering column housing.

* * * * *